United States Patent
Lavelle et al.

(10) Patent No.: US 6,795,080 B2
(45) Date of Patent: Sep. 21, 2004

(54) BATCH PROCESSING OF PRIMITIVES FOR USE WITH A TEXTURE ACCUMULATION BUFFER

(75) Inventors: Michael G. Lavelle, Saratoga, CA (US); David C. Kehlet, Los Altos, CA (US); Michael A. Wasserman, Redwood City, CA (US); Nandini Ramani, Saratoga, CA (US); Ranjit S. Oberoi, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 259 days.

(21) Appl. No.: 10/060,954

(22) Filed: Jan. 30, 2002

(65) Prior Publication Data

US 2003/0142104 A1 Jul. 31, 2003

(51) Int. Cl.[7] .................................. G06T 11/40
(52) U.S. Cl. .................. 345/552; 345/582; 345/614; 345/503
(58) Field of Search .................... 345/419, 582, 345/441, 503, 506, 520, 522, 545, 552, 614

(56) References Cited

U.S. PATENT DOCUMENTS

| | | | | |
|---|---|---|---|---|
| 6,392,655 B1 | * | 5/2002 | Migdal et al. | 345/582 |
| 6,480,200 B1 | * | 11/2002 | Fisher et al. | 345/582 |
| 6,483,505 B1 | * | 11/2002 | Morein et al. | 345/419 |
| 2002/0140703 A1 | * | 10/2002 | Baker et al. | 345/582 |
| 2003/0030643 A1 | * | 2/2003 | Taylor et al. | 345/531 |

OTHER PUBLICATIONS

Watt, Alan, "3D Computer Graphics," 2000, pp. 227–247.

* cited by examiner

Primary Examiner—Ulka J. Chauhan
(74) Attorney, Agent, or Firm—Meyertons Hood Kivlin Kowert & Goetzel, P.C.; Jeffrey C. Hood; Mark K. Brightwell

(57) ABSTRACT

A graphics system configured to apply multiple layers of texture information to batches of primitives. The graphics system collects primitives into a batch that share a common set of texture layers to be applied. The batch is limited so that the total estimate size of the batch is less than or equal to a storage capacity of a texture accumulation buffer. The graphics system stores samples (or fragments) corresponding to the batch primitives in the texture accumulation buffer between the application of successive texture layers.

25 Claims, 9 Drawing Sheets

BATCH PROCESSING OF PRIMITIVES FOR USE WITH A TEXTURE ACCUMULATION BUFFER

BACKGROUND OF THE INVENTION

1. Field of the Invention

This invention relates generally to the field of computer graphics and, more particularly, to high performance graphics systems for rendering graphical objects based on a decomposition of the graphical objects into primitives such as triangles, dots and lines.

2. Description of the Related Art

A graphics system may be configured to receive a stream of graphics parameters defining primitives such as triangles, lines and dots from a host application executing on a host computer. For example, the graphics system may receive a stream of vertices defining triangles in a 3D coordinate space. The triangles represent a collection of 3D objects in the 3D world coordinate space. The graphics system may operate on the triangles to generate a video stream which represents the view of a virtual camera (or virtual observer) in the 3D world coordinate space. In particular, the graphics system may compute color values for each pixel that resides within each triangle (i.e. within the two-dimensional footprint of the triangle in screen space). This process of assigning color values to pixels (or samples) internal to triangles is referred to herein as triangle rasterization.

Triangle rasterization may include the application of one or more textures. In other words, the graphics system may store one or more texture maps in a texture memory and may modify the color of pixels using the one or more texture maps. For example, pixels residing internal to a given triangle comprising part of a wall may be textured with three texture maps, the first map giving the triangle the appearance of brick material, the second map for putting oil smudges on the brick-textured triangle, the third map for varying the level of illumination of pixels on the oil-smudged brick-textured triangle.

According to one conventional rasterization method, each pixel in a given triangle may be textured with all N textures (from the N corresponding texture maps) before proceeding to the next pixel (interior to the triangle) along a scan line or on the next scan line. In other words, a processor may compute color values for a pixel $P_1$ by sequentially accessing a texel from texture map #1, a texel from texture map #2, ..., a texel from texture map #N. Then after completing the computation of color values for pixel $P_I$, the processor may compute color values for the next pixel $P_{I+1}$ interior to the triangle by sequentially accessing a texel from texture map #1, a texel from texture map #2, ..., a texel from texture map #N. This method of texturing triangles is very inefficient in its use of texture memory as the frequency of cache misses and page misses is large.

Thus, there exists a need for a graphics system and method which could more efficiently apply multiple layers of texture to primitives.

SUMMARY OF THE INVENTION

A graphics system is configured to apply multiple layers of texture information to batches of graphics primitives (e.g. triangles, dots, lines, etc.). In one set of embodiments, the graphics system includes a hardware accelerator, a frame buffer, a video output processor and a texture memory. The texture memory may store multiple layers of texture information.

The hardware accelerator collects primitives into a batch that share a common set of texture layers to be applied. The batch is limited so that the total estimated size (e.g. fragment size or sample size) for the batch is less than or equal to a storage capacity of a texture accumulation buffer. In some embodiments, a fragment size estimate for the batch may be a sum of size estimates for the individual primitives. In other embodiments, the fragment size estimate for a batch may involve an incremental polygon area computation and/or an incremental polygon perimeter computation, especially for a batch of chained primitives (such as a strip or fan). The hardware accelerator stores samples (or fragments) corresponding to the batch primitives in the texture accumulation buffer between the application of successive texture layers.

Because the hardware accelerator operates on a batch of primitives, the large magnitude address jumps between texture layers in the address space of the texture memory may occur less often than if the hardware accelerator cycled through all texture layers per fragment per primitive. Thus, texture accesses to texture memory may be more efficient.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
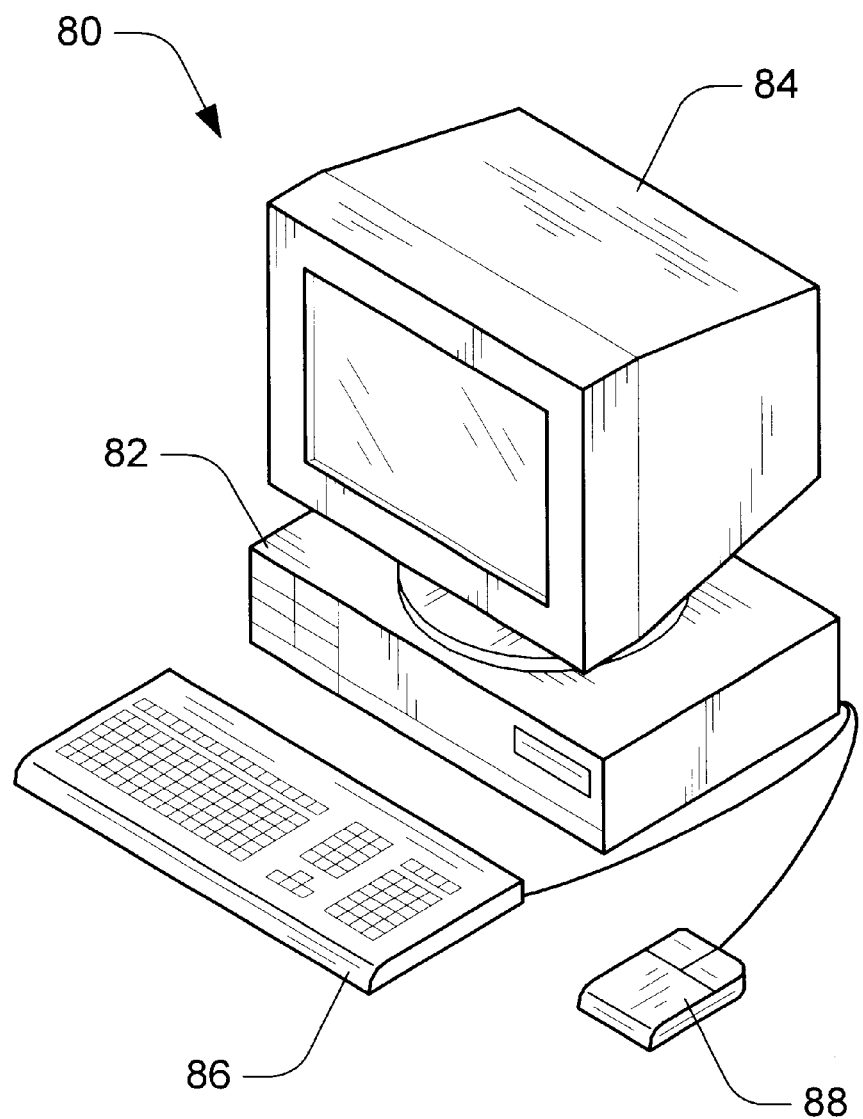
FIG. 1 illustrates one embodiment of a graphics system configured to perform 3D graphics computations for display of graphical object on a display device.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF SEVERAL EMBODIMENTS

Computer System—FIG. 1

Referring now to FIG. 1, one embodiment of a computer system 80 that includes a graphics system is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
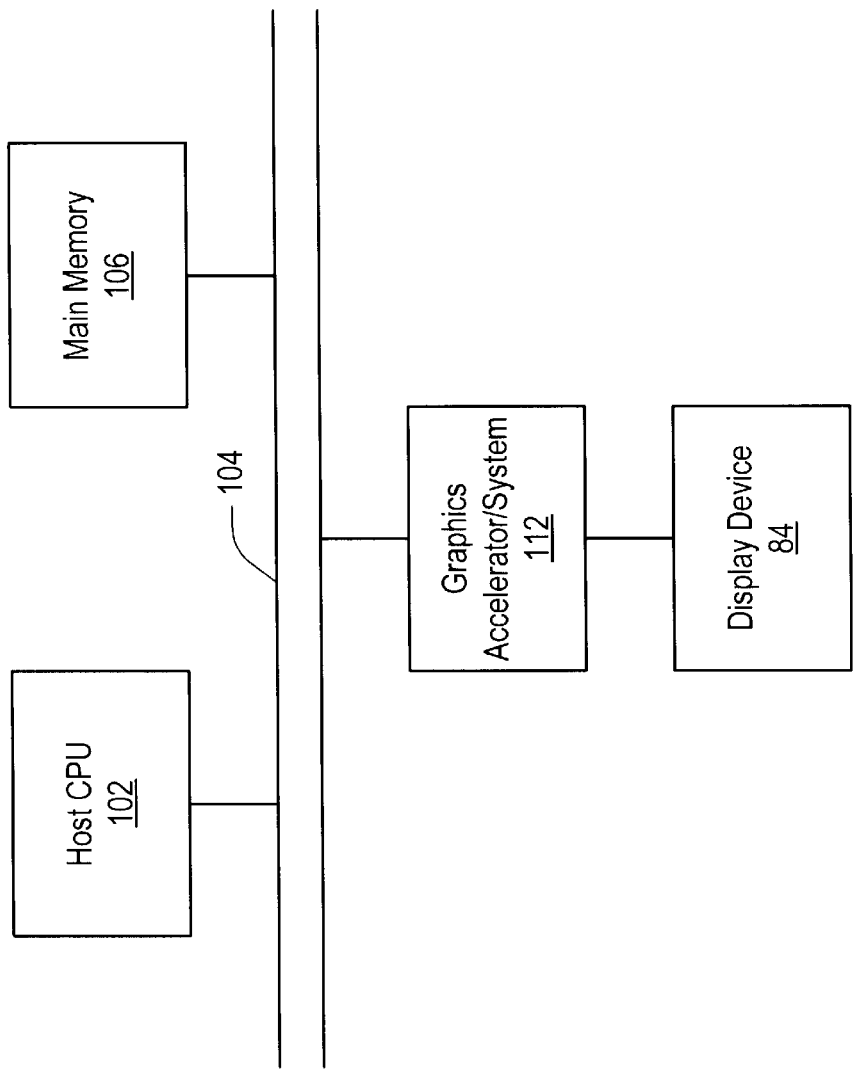
FIG. 2 is a block diagram for one embodiment of computer system 80.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
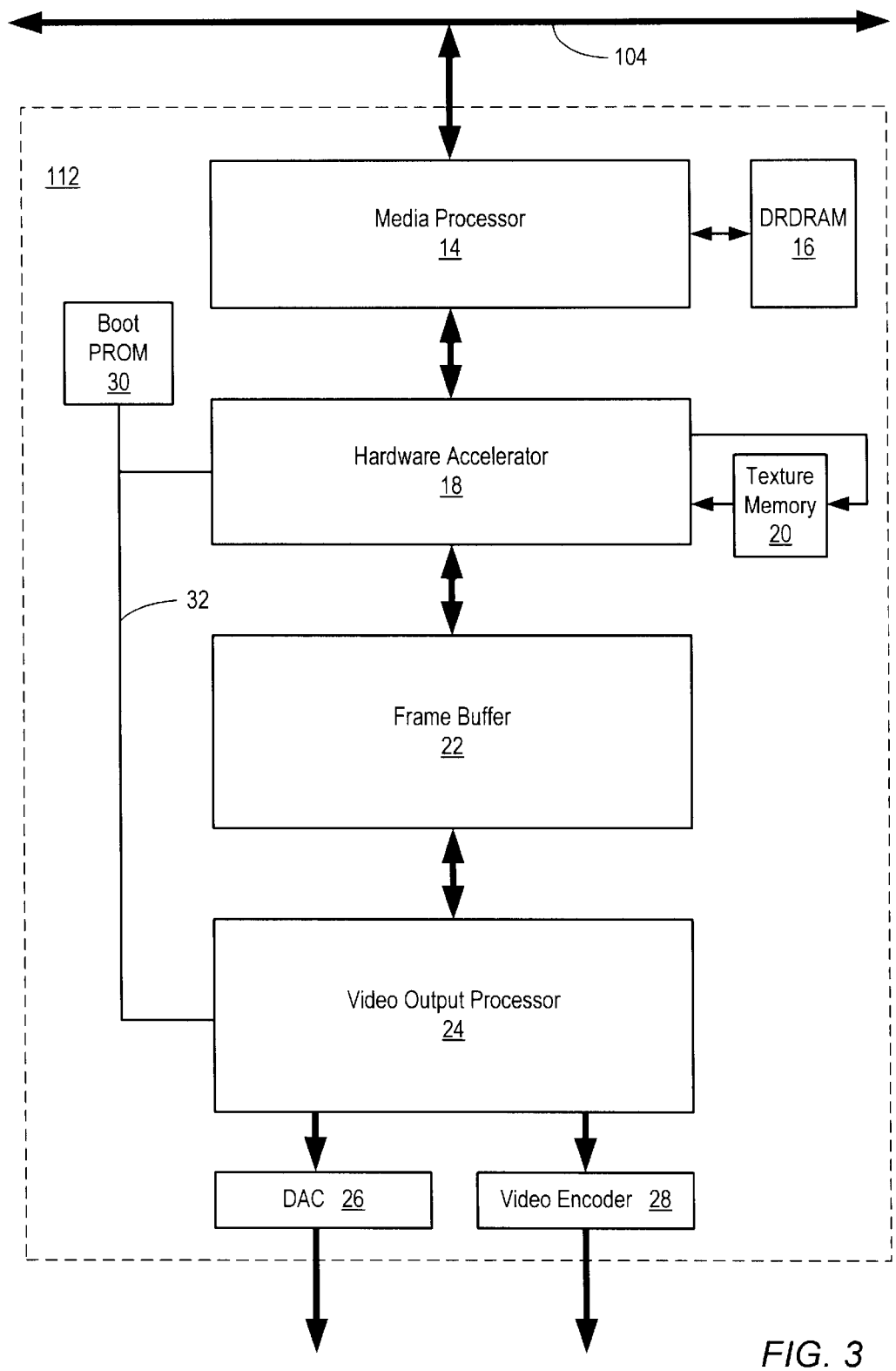
FIG. 3 is a block diagram for one embodiment of a graphics system configured to generate one or more video streams in response to received graphics data.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
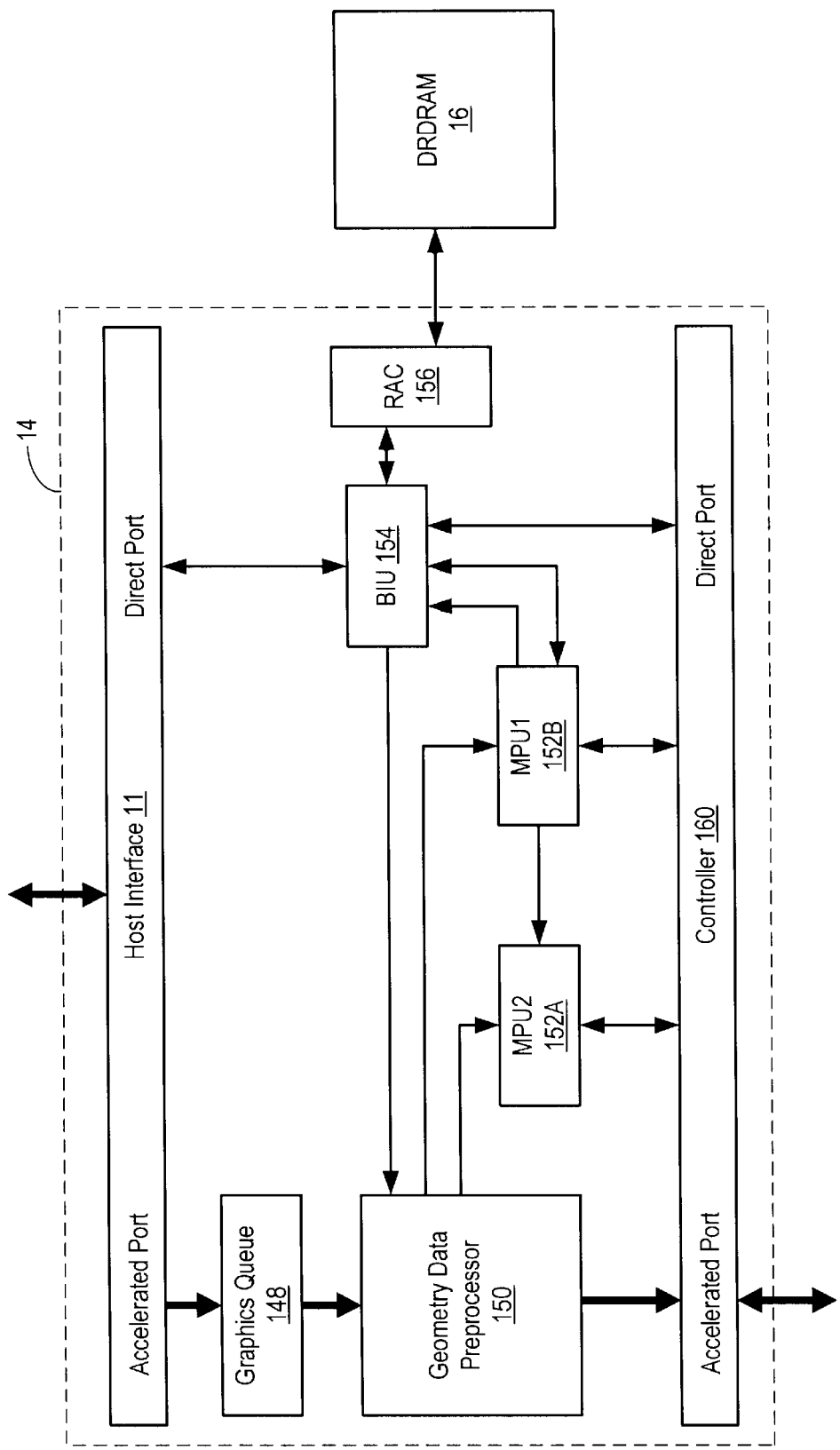
FIG. 4 is a block diagram for one embodiment of media processor 14.

Media Processor—FIG. 4

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
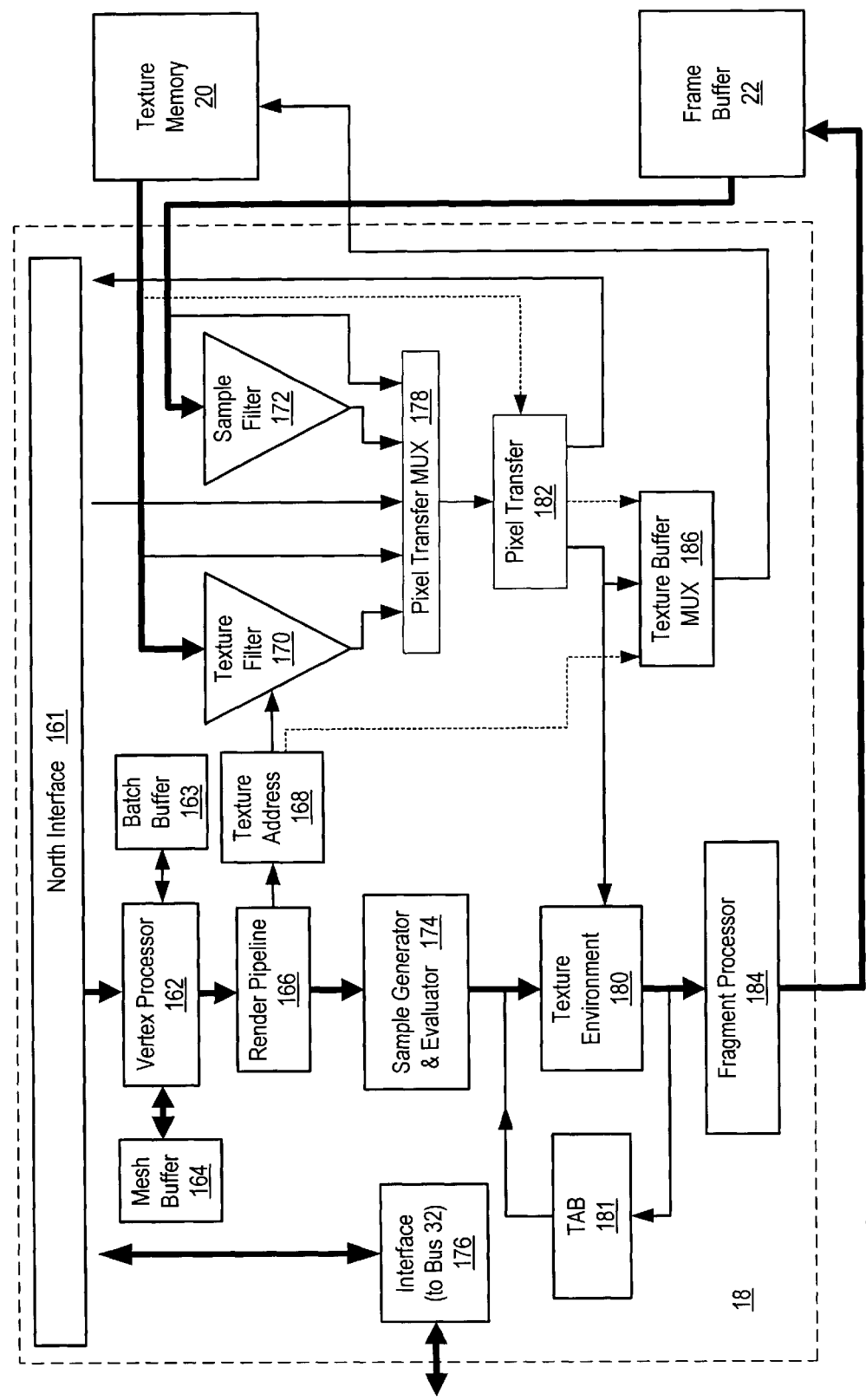
FIG. 5 is a block diagram for one embodiment of hardware accelerator 18.

Hardware Accelerator—FIG. 5

One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture memory 20. For example, hardware accelerator 18 may interface to texture memory 20 using an eight-way interleaved texel bus that allows hardware accelerator 18 to read from and write to texture memory 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture memory 20. The texture memory 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture memory 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture memory 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture memory 20 or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Memory 20

Texture memory 20 may include several SDRAMs. Texture memory 20 may be configured to store texture maps and image processing buffers for hardware accelerator 18. Texture memory 20 may have many different capacities (e.g., depending on the type of SDRAM included in texture memory 20). In some embodiments, each pair of SDRAMs may be independently row and column addressable.

Frame Buffer 22

Graphics system 112 may also include a frame buffer 22. In one embodiment, frame buffer 22 may include multiple 3DRAM64s. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and supersample buffer.

Figure 6:
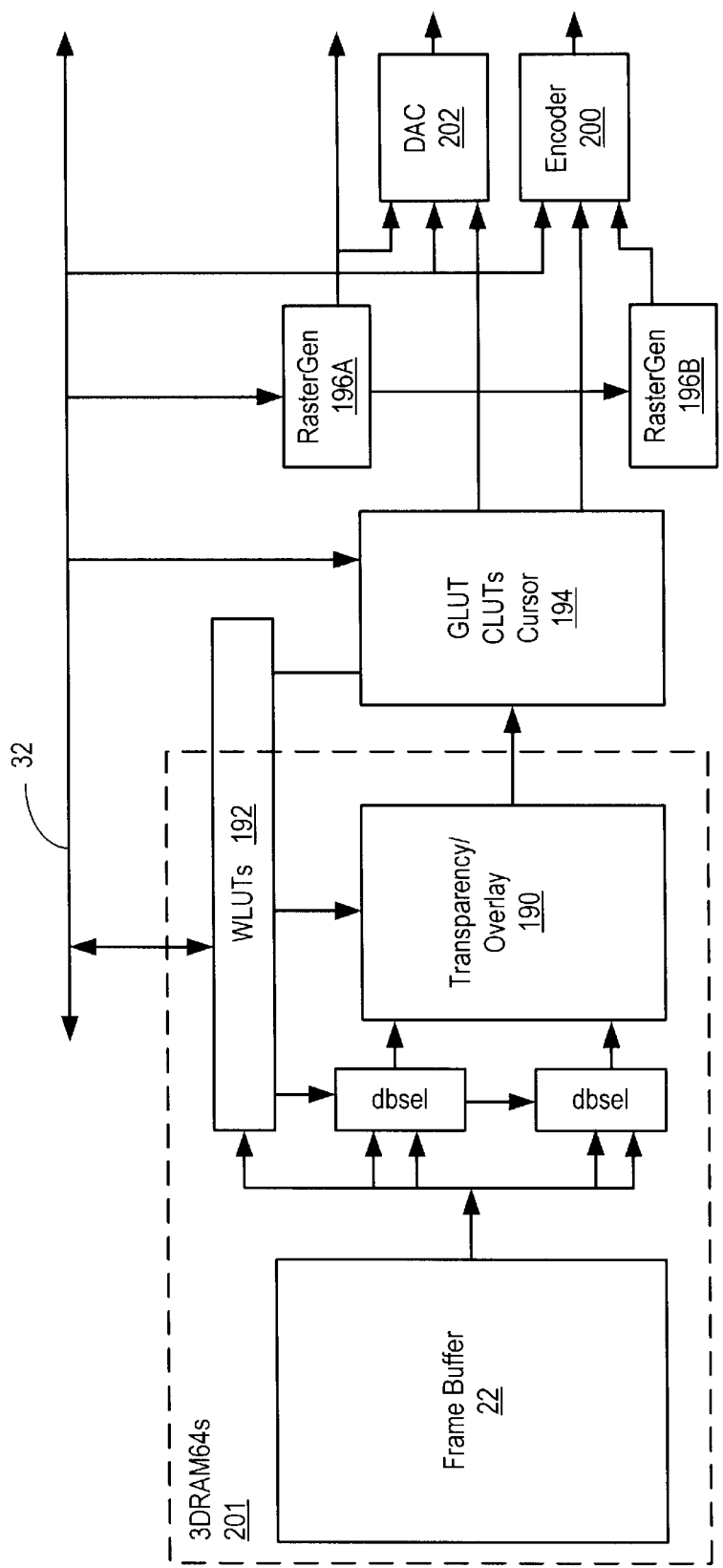
FIG. 6 is a block diagram for one embodiment of video output processor 24.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 202 may operate as the final output stage of graphics system 112. The DAC 202 translates the digital pixel data received from GLUT/CLUTs/Cursor unit 194 into analog video signals that are then sent to a display device. In one embodiment, DAC 202 may be bypassed or omitted completely in order to output digital pixel data in lieu of analog video signals. This may be useful when a display device is based on a digital technology (e.g., an LCD-type display or a digital micro-mirror display).

DAC 202 may be a red-green-blue digital-to-analog converter configured to provide an analog video output to a display device such as a cathode ray tube (CRT) monitor. In one embodiment, RGB DAC 202 may be configured to provide a high resolution RGB analog video output at dot rates of 240 MHz. Similarly, encoder 200 may be configured to supply an encoded video signal to a display. For example, encoder 200 may provide encoded NTSC or PAL video to an S-Video or composite video television monitor or recording device.

In other embodiments, the video output processor 24 may output pixel data to other combinations of displays. For example, by outputting pixel data to two DACs 202 (instead of one DAC 202 and one encoder 200), video output processor 24 may drive two CRTs. Alternately, by using two encoders 200, video output processor 24 may supply appropriate video input to two television monitors. Generally, many different combinations of display devices may be supported by supplying the proper output device and/or converter for that display device.

Overall Processing Flow

Hardware accelerator 18 receives a stream of graphics data from media processor 14. The graphics data specifies primitives to be rendered such as triangles, lines and dots. For example, for a triangle, the graphics data may include vertex positions, vertex color vectors, and a specification of which texture layers are to be applied to the triangle. The graphics data may also include texture control parameters which determine how the specified texture layers are to be applied to a given primitive.

Hardware accelerator 18 may render the primitives in terms of samples. The samples may be stored in a sample area of frame buffer 22. The samples are then read from the sample area of frame buffer 22 and filtered by sample filter 22 to generate pixels. The pixels are stored in a pixel area of frame buffer 22. The pixel area may be double buffered. Video output processor 24 reads pixels from the pixel area of frame buffer 22 and generates a video signal from the pixels. The video signal is made available to one or more display devices (e.g. monitors and/or projectors).

Figure 7:
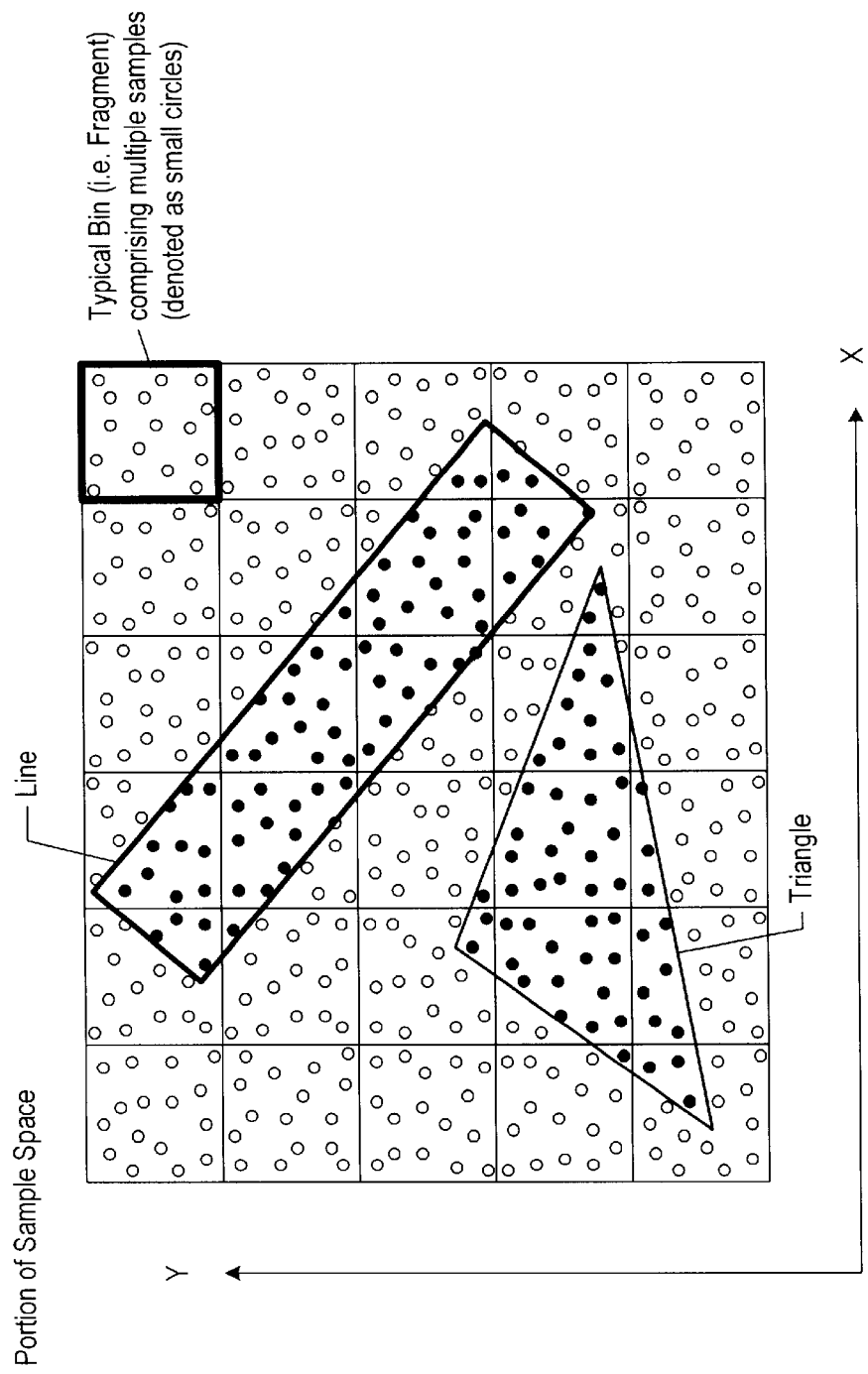
FIG. 7 illustrates a portion of rendering space populated with samples and partitioned into fragments (i.e. bins) according to one set of embodiments.

The samples are computed at positions in a two-dimensional sample space (also referred to as rendering space). The sample space is partitioned into an array of bins (also referred to herein as fragments). The storage of samples in the sample area of frame buffer 22 may be organized according to bins (e.g. bin 300) as suggested by FIG. 7. Each bin contains one or more samples. The number of samples per bin may be a programmable parameter.

Texture Pipe and Multitexturing Support

As shown in FIG. 5, in one set of embodiments, hardware accelerator 18 includes texture address unit 168, texture filter 170, texture environment 180 and texture accumulation buffer (TAB) 181. These units are collectively referred to herein as the texture pipe as they each have a role in the process of applying texture information to primitives. Pixel transfer MUX 178 and pixel transfer unit 182 may participate in texture processing operations as well as other types of processing operations.

The hardware accelerator 18 supports the application of multiple layers of texture to primitives. The multiple layers of texture are stored in texture memory 20. Each layer may comprise multiple mipmap levels.

Vertex processor 162 may receive a stream of graphics data from media processor 14. The graphics data corresponds to primitives that are to be rendered. Primitives include graphical elements such as triangles, lines and dots. The graphics data associated with a given primitive may include geometric parameters, one or more color vectors, and texture parameters. The geometric parameters define the primitive geometrically. The texture parameters specify which texture layers are to be applied to the primitives as well as texture coordinates for the primitive with respect to the specified layers. In the case of a triangle, the geometric parameters may comprise vertex positions, and the one or more color vectors may be color vectors associated with the vertex positions.

In one set of embodiments, hardware accelerator 18 is configured to apply textures to a batch of primitives. Each primitive in the batch intersects one or more fragments (i.e. bins) in the rendering space. For example, the triangle of FIG. 7 intersects 11 fragments and the line of FIG. 7 intersects 13 fragments. Let $N_P$ denote the number of fragments which intersect with a primitive P. The number $N_P$ is referred to herein as the fragment size of the primitive P.

Texture accumulation buffer 181 applies textures to the batch of primitives one texture layer at a time. Fragments corresponding to the primitives of the batch are stored in texture accumulation buffer between the application of successive texture layers. Thus, the sum of the fragment sizes $N_P$ of the primitives P in the batch may be limited to a value less than or equal to the fragment capacity of texture accumulation buffer 181. The fragment capacity of the TAB 181 is the maximum number of fragments that texture accumulation buffer 181 can hold.

Vertex processor 162 gathers a batch of primitives as follows. Starting from an initial state where the batch is empty, vertex processor 162 receives a first primitive $P_0$ and associated texture data $T_0$ from media processor 14 and generates an estimate $E_{P0}$ for the fragment size $N_{P0}$ of the first primitive $P_0$. Methods for generating the extimate $E_{P0}$ will be discussed later. The estimate $E_{P0}$ may be an upper bound for the fragment size $N_{P0}$. (An upper bound for X is any number U greater than or equal to X.)

Vertex processor 162 may add the estimate $E_{P0}$ to a cumulative sum S according to the relation $S=S+E_{P0}$. The cumulative sum equals zero in the initial state. Vertex processor 162 may add the first primitive $P_0$ to the batch, i.e. store the first primitive in a batch buffer 163 as indicated in FIG. 5. Vertex processor may send the first primitive $P_0$ downstream to render pipe 166 with a first texture layer indicator indicating a first of the texture layers to be applied to the first primitive $P_0$.

Vertex processor 162 receives a second primitive $P_1$ and associated texture data $T_1$ from media processor 14, and generates an estimate $E_{P1}$ for the fragment size $N_{P1}$ of the second primitive $P_1$. The texture data $T_1$ specifies which texture layers are to be applied to the second primitive $P_1$. Vertex processor 162 determines if the texture layers specified for the second primitive $P_1$ are the same as the texture layers specified for the first primitive $P_0$. This is the layer agreement test.

Vertex processor 162 may also perform a cumulative size test as follows. Vertex processor 162 may add the fragment size estimate $E_{P1}$ of primitive $P_1$ to the cumulative sum S according to the relation $S=S+E_{P1}$, and compare the updated cumulative sum to the fragment capacity $N_{TAB}$ of texture accumulation buffer 181. (It is noted that the layer agreement test and the cumulative size test may be performed sequentially or in parallel.)

If the layer agreement test and the cumulative size test both pass, i.e. if the two sets of layers are equal and the updated cumulative sum is less than or equal to the fragment capacity $N_{TAB}$, vertex processor 162 may add the second primitive $P_1$ to the batch (i.e. append the second primitive to the batch list stored in the batch buffer), and send the second primitive $P_1$ downstream to render pipe 166 with the first texture layer indicator.

More generally, vertex processor 162 receives a $K^{th}$ primitive $P_K$ and associated texture data $T_K$ from media processor 14, and generates an estimate $E_{PK}$ for the fragment size $N_{PK}$ of the $K^{th}$ primitive $P_K$, where K is an integer index greater than or equal to one. The texture data $T_K$ specifies which texture layers are to be applied to the $K^{th}$ primitive $P_K$. The texture data $T_K$ may also comprise texture coordinate data for the specified texture layers. Vertex processor 162 determines if the texture layers specified for the $K^{th}$ primitive $P_K$ are the same as the texture layers specified for the first primitive P0 of the batch.

Vertex processor 162 may add the fragment size estimate $E_{PK}$ to the cumulative sum S according to the relation $S=S+E_{PK}$, and compare the updated cumulative sum to the fragment capacity $N_{TAB}$ of texture accumulation buffer 181.

If the layer agreement test and the cumulative size test both pass, i.e. if the two sets of layers are equal and the updated cumulative sum is less than or equal to the fragment capacity $N_{TAB}$, vertex processor 162 may add the $K^{th}$ primitive $P_K$ to the batch (i.e. append the $K^{th}$ primitive $P_K$ to the batch list stored in the batch buffer), and send the $K^{th}$ primitive $P_K$ downstream to render pipe 166 with the first texture layer indicator. Observe that the texture layers of the first primitive $P_0$ set the standard for the whole batch and are referred to as the batch texture layers.

After adding the primitive $P_K$ to the batch and sending it to render pipe 166 with the first layer indicator, vertex processor 162 may receive and process the next primitive $P_{K+1}$.

It is noted that the layer agreement test and the cumulative size test may be performed sequentially or in parallel.

If either or both of the layer agreement test and the cumulative size test fails, vertex processor 162 may store the $K^{th}$ primitive $P_K$ in a temporary buffer TMP, reinitialize the cumulative sum to zero, and initiate a "finish up" procedure on the current batch. Note that the $K^{th}$ primitive $P_K$ is temporarily set aside (in the temporary buffer) and not added to the current batch. Thus, the current batch includes primitives $P_0$ through $P_{K-1}$.

Vertex processor 162 performs the finish up procedure on the current batch as follows. Let $L_0, L_1, L_2, \ldots, L_{M-1}$ denote the batch texture layers, i.e. the texture layers specified by primitive $P_0$, where M is the number of batch texture layers. Texture layer $L_0$ is the first texture layer referred to above. For each texture layer $L_I$ of the second and succeeding batch texture layers (i.e. for each value of the index I in the range 1, 2, ..., M−1), vertex processor 162:

reads each primitive $P_J$ in the batch buffer, and sends the primitive $P_J$ to render pipe 166 with a texture layer indicator corresponding to texture layer $L_I$, where J runs through the range 0, 1, 2, ..., K−1, where K is the number of primitives in the batch buffer.

In other words, vertex processor 162 cycles through the batch buffer (M−1) times. Each cycle corresponds to a different one of the second and succeeding batch texture layers. Note that each primitive of the batch will have been sent down to the render pipe with the first layer indicator corresponding to first layer $L_0$ as it is added to the batch and thus prior to the finish up procedure.

After completing the finish up procedure on the current batch, vertex process 162 may flush the batch buffer, i.e. reinitialize the list of primitives stored in the batch buffer to the empty list, and restart a new batch with the primitive stored in the temporary buffer.

As described above, render pipe 162 may receive multiple versions of the batch primitives. Each version of a primitive includes or is associated with a texture layer indicator. The version corresponding to primitive $P_J$ and texture layer $L_I$ is denoted $P_J/L_I$. Render pipe 166 may receive the primitive versions in the order:

$P_0/L_0, P_1/L_0, P_2/L_0, \ldots, P_{K-1}/L_0,$ $P_0/L_1, P_1/L_1, P_2/L_1, \ldots, P_{K-1}/L_1,$ $P_0/L_2, P_1/L_2, P_2/L_2, \ldots, P_{K-1}/L_2,$ $P_0/L_{M-1}, P_1/L_{M-1}, P_2/L_{M-1}, \ldots, P_{K-1}/L_{M-1},$ where M is the number of texture layers to be applied to the current batch. In response to the primitive versions $P_0/L_0$, $P_1/L_0, P_2/L_0, \ldots, P_{K-1}/L_0$ corresponding to the first layer $L_0$, render pipe 166 generates samples for the primitives, and the texture pipe applies texture values corresponding to layer $L_0$ to the samples and stores the updated samples in texture accumulation buffer 181. In response to the primitive versions $P_0/L_I, P_1/L_I, P_2/L_I, \ldots, P_{K-}/L_1$ for any layer $L_1$ beyond layer $L_0$, the texture pipe reads the samples from the texture accumulation buffer 181, applies texture values corresponding to layer $L_I$ to the samples, and stores the updated samples in texture accumulation buffer 181 once again.

In response to receiving version $P_J/L_0$ corresponding to batch primitive $P_J$ and the first texture layer $L_0$, where J is any value in the range 0, 1, 2, ..., K−1, render pipe 166 may determine a set of fragments (i.e. bins) which geometrically intersect the primitive $P_J$. For each intersecting fragment $F_v$, render pipe 166 may (a) send the fragment $F_v$ to sample generator and evaluator 174 for sample processing; and (b) send a request to the texture pipe for a texture value $t0_v$ corresponding to first texture layer $L_0$ and fragment $F_v$.

In response to receiving the fragment $F_v$, sample generator and evaluator 174:

(1) populates the fragment $F_v$ with sample positions $S_{vk}$;

(2) determines which of the sample positions $S_{vk}$ reside interior to the primitive $P_J$;

(3) computes an initial color vector $C0_{vk}$ for each sample position $S_{vk}$ interior to the primitive $P_J$; and (4) sends the fragment $F_v$ including the sample color vectors $C0_{vk}$ corresponding to the interior sample positions $S_{vk}$ to texture environment 180.

The initial color vectors $C0_{vk}$ may be computed based on a spatial interpolation of color. For example, in the case of a triangle, the initial color vectors may be interpolated from color vectors associated with the triangle vertices. The index v counts fragments. The index k occuring in the index pair vk counts samples within a given fragment $F_v$.

In response to request (b), the texture pipe accesses texture layer $L_0$ stored in texture memory 20 to obtain texels, and performs filtering (e.g. bilinear or trilinear filtering) on the texels to generate the texture value $t0_v$. The "0" in the notation $t0_v$ is a reminder that the texture value $t0_v$ is derived from texture layer $L_0$. The "v" in the notation $t0_v$ is a reminder that the texture value corresponds to fragment $F_v$.

Primitive version $P_J/L_0$ may include texture coordinate data corresponding to primitive $P_J$ and texture layer $L_0$. Texture address unit 168 may receive the texture coordinate data and the fragment address of fragment $F_v$ from render pipe 166, and responsively generate read addresses (in the address space of texture memory 20) for the texels from layer $L_0$ which contribute to the computation of texture value $t0_v$.

Texture filter 170 uses the read addresses to access the texels from layer $L_0$ and performs filtering (e.g. bilinear or trilinear filtering) on the texels to generate the texture pixel transfer unit 182 to texture environment 180.

Texture environment 180 receives (i) the initial color vectors $C0_{vk}$ for the interior sample positions $S_{vk}$ of the intersecting fragment $F_v$, and (ii) the texture value $t0_v$. Interior sample positions $S_{vk}$ are the sample positions in fragment $F_v$ which fall inside the current primitive $P_J$. Texture environment 180 applies the texture value $t0_v$ to the initial color vectors $C0_{vk}$ of the interior sample positions $S_{vk}$ to generate resultant color vectors $R0_{vk}$. For example, texture environment 180 may apply the texture value $t0_v$ to each initial color vector $C0_{vk}$ to generate the corresponding resultant color vector $R0_{vk}$. The resultant color vectors $R0_{vk}$ for the interior samples of fragment $F_v$ are stored in TAB 181.

Any of a variety of mathematical formulas may be used by texture environment 180 to apply the texture values to the color vectors. Texture environment 180 may be programmable to employ different formulas at different times. Alternatively, texture environment 180 may employ a formula with fixed mathematical structure but programmable parameters. In one embodiment, texture environment 180 may comprise dedicated circuitry for implementing one or more texturing formulas.

In one set of embodiments, the initial color vector $C0_{vk}$ contains a transparency value in addition to red, green and blue color values (e.g. diffuse color values). Other per-sample attributes may be included as well.

Render pipe 166 and the texture pipe process each of the primitive versions $P_0/L_0$, $P_1/L_0$, $P_2/L_0$, ..., $P_{K-1}/L_0$ corresponding to texture layer $L_0$ as described above for the generic member $P_J/L_0$. The fragments corresponding to each of the versions in this layer $L_0$ group are stored in texture accumulation buffer 181. Because the cumulative sum of fragment sizes of the primitives in the batch is less than or equal to the fragment capacity of the texture accumulation buffer 181, the texture accumulation buffer 181 may advantageously avoid an overflow condition.

In response to receiving version $P_J/L_1$ corresponding to batch primitive $P_J$ and the second texture layer $L_1$, render pipe 166 may determine a set of fragments (i.e. bins) which geometrically intersect the primitive $P_J$. For each intersecting fragment $F_v$, render pipe 166 may (a) send an indication of the fragment $F_v$ to texture environment 180; and (b) send a request to the texture pipe for a texture value $t1_v$ corresponding to second texture layer $L_1$ and fragment $F_v$.

In response to request (b), the texture pipe accesses texture layer $L_1$ stored in texture memory 20 to obtain texels, and performs filtering (e.g. bilinear or trilinear filtering) on the texels to generate the texture value $t1_v$. The "1" in the notation $t1_v$ is a reminder that the texture value $t1_v$ is derived from texture layer $L_1$. The "v" in the notation $t1_v$ is a reminder that the texture value corresponds to fragment $F_v$.

Primitive version $P_J/L_1$ may include texture coordinate data corresponding to primitive $P_J$ and texture layer $L_1$. Texture address unit 168 may receive the texture coordinate data and the fragment address of fragment $F_v$ from render pipe 166, and responsively generate read addresses (in the address space of texture memory 20) for the texels from layer $L_1$ which contribute to the computation of texture value $t1_v$.

Texture filter 170 uses the read addresses to access the texels from layer $L_1$ and performs filtering (e.g. bilinear or trilinear filtering) on the texels to generate the texture value $t1_v$. The texture value $t1_v$ may then be fed through pixel transfer MUX 178 and pixel transfer unit 182 to texture environment 180.

Texture environment 180 may read the color vectors $R0_{vk}$ for the interior sample positions $S_{vk}$ of the intersecting fragment $F_v$ from texture accumulation buffer 181, and receive the texture value $t1_v$ generated by texture filter 170. Texture environment 180 applies the texture value $t1_v$ to the color vectors $R0_{vk}$ of the interior sample positions $S_{vk}$ to generate resultant color vectors $R1_{vk}$. For example, texture environment 180 may apply the texture value $t1_v$ to each color vector $R0_{vk}$ to generate the corresponding resultant color vector $R1_{vk}$. The resultant color vectors $R1_{vk}$ for the interior samples of fragment $F_v$ are then stored in TAB 181.

In some embodiments, texture environment 180 overwrites fragment $F_v$ in TAB 181 with the updated color information, i.e. overwrites the color vectors $R0_{vk}$ with the updated color vectors $R1_{vk}$.

Render pipe 166 and the texture pipe process each of the primitive versions $P_0/L_1$, $P_1/L_1$, $P_2/L_1$, ..., $P_{K-1}/L_1$ corresponding to texture layer $L_1$ as described above for the generic member $P_J/L_1$. The fragments corresponding to each of the versions in this layer $L_1$ group are stored in texture accumulation buffer 181. Again, because the cumulative sum of fragment sizes of the primitives in the batch is less than or equal to the fragment capacity of the texture accumulation buffer 181, the texture accumulation buffer 181 may advantageously avoid an overflow condition.

Texture layers $L_2, L_3, ..., L_{M-1}$ (i.e. the third through last layers) may be applied to the batch primitives in the same fashion as the second layer $L_1$. This is illustrated by the following pseudo-code fragment for primitive version $P_J/L_I$ corresponding to primitive $P_J$ and layer $L_I$, where I is any integer in the range 1, 2, ..., M−1.

For each fragment $F_v$ intersecting the primitive $P_J$:

Texture pipe generates texture value $tI_v$ for fragment $F_v$ by accessing and filtering appropriate texels from layer $L_I$ of texture memory 20;

Texture environment reads fragment $F_v$ from TAB 181;

Texture environment applies texture value $tI_v$ to sample color vectors $R(I-1)_{vk}$ comprised within fragment $F_v$ and corresponding to interior samples to obtain resultant sample color vectors $RI_{vk}$;

Texture environment stores resultant sample color vectors $RI_{vk}$ in TAB 181.

Thus, texture layer $L_0$ is applied to sample colors received from sample generator and evaluation unit, whereas layers $L_1$ though $L_{M-1}$, are applied to sample colors received from TAB 181.

In the application of the last texture layer $L_{M-1}$, texture environment 180 may store the final sample color vectors $R(M-1)_{vk}$ into TAB 181 and send pointers to the fragments $F_v$ to fragment processor 184 (i.e. pointers in the TAB address space). Fragment processor 184 may forward the fragments (including the final sample color vectors $R(M-1)_{vk}$ to the sample area of frame buffer 22. Alternatively, texture environment 180 may send the final sample color vectors $R(M-1)_{vk}$ directly to fragment processor 184 and thus storage of final sample color vectors $R(M-1)_{vk}$ in TAB 181 may be avoided.

In general, the texture pipe processes all the batch primitives with respect to texture layer $L_I$ before proceeding to texture layer $L_{I+1}$. This strategy of processing fragments of the batch primitives in an inner loop and the texture layers as the outer loop significantly reduces thrashing of texture memory 20. The large magnitude address jump between texture layers may advantageously occur less often. Successive fragments within a texture layer corresponding to a given batch primitive induce relatively small address jumps in the texture memory address space because the fragments are spatially localized to a neighborhood defined by the primitive. Successive fragments within a texture layer corresponding to distinct primitives of a batch may induce address jumps which are small relative to the jumps between texture layers, especially if the distinct primitives are close to each other spatially. Thus, there may be a significantly decreased probability of encountering page misses and cache misses for the texture accesses to texture memory 20 associated with fragments of a batch relative to an alternate strategy of cycling through texture layers per primitive or per fragment per primitive.

It is noted that the processing methodology described in the embodiments above may be used for effects other than traditional texturing. For example, one of the texture layers may be interpreted as an illumination map which modulates the intensity of rendered samples and/or fragments. Thus, the texture layers stored in texture memory 20 should be broadly interpreted to include any of various types of image information usable to modify pixel or sample colors.

In one set of embodiments, hardware accelerator 18 is an application specific integrated circuit (ASIC) which is optimized for the sample and texture processing operations described herein. TAB 181 may be implemented as on-chip SRAM.

Multitexturing with Deferred Sample Generation

In a second set of embodiments, texture layers are applied to the batch primitives at fragment resolution (not at sample resolution), stored in TAB 181 at fragment resolution, and samples are generated for fragments after the penultimate texture layer (i.e. layer $L_{M-2}$) has completed. Thus, the generation of samples may operate in parallel with the application of the last texture layer $L_{M-1}$ to the batch primitives at fragment resolution. The samples are generated at sample positions interior to the fragments. The final per-fragment color vectors resulting from the application of the last texture layer are applied to the samples to generate per-sample color vectors.

In response to version $P_J/L_0$ corresponding to batch primitive $P_J$ and the first layer $L_0$, render pipe 166 may generate a single color vector $C0_\nu$ for each fragment $F_\nu$ that intersects the batch primitive $P_J$. Thus, color vector $C0_\nu$ may be referred to as a fragment color vector. Texture environment 180 receives the texture value $t0_\nu$ corresponding to layer $L_0$ for each fragment $F_\nu$ from texture filter 170, and applies the texture value $t0_\nu$ to the corresponding fragment color vector $C0_\nu$. The resulting fragment color vector $R0_\nu$ is stored into TAB 181.

When the fragments $F_\nu$ corresponding to all the primitives of the current batch have been processed with respect to the first layer $L_0$, i.e. the primitive versions $P_0/L_0$, $P_1/L_0$, $P_2/L_0$, ..., $P_{K-1}/L_0$ have been processed, texture environment 180 processes the primitive versions $P_0/L_1$, $P_1/L_1$, $P_2/L_1$, ..., $P_{K-1}/L_1$ with respect to second layer $L_1$ as follows. Given the primitive version $P_J/L_1$ corresponding to primitive $P_J$ and second layer $L_1$, texture environment 180 receives the texture value $t1_\nu$ corresponding to second texture layer $L_1$ for each fragment $F_\nu$ intersecting the primitive $P_J$ from texture filter 170, reads the fragment color vector $R0_\nu$ corresponding to fragment $F_\nu$ from TAB 181, and applies the texture value $t1_\nu$ to fragment color vector $R0_\nu$ to generate resultant fragment color vector $R1_\nu$. The resultant fragment color vector $R1_\nu$ is stored into TAB 181.

Texture layers $L_2$ through $L_{M-1}$, are applied to the batch primitives at fragment resolution in a similar fashion to the second layer $L_1$. Let I be any integer in the range one through M−2. When the fragments $F_\nu$ corresponding to all the primitives of the current batch have been processed with respect to the layer $L_{I-1}$, i.e. the primitive versions $P_0/L_{I-1}$, $P_1/L_{I-1}$, $P_2/L_{I-1}$, ..., $P_{K-1}/L_{I-1}$ have been processed, texture environment 180 processes the primitive versions $P_0/L_I$, $P_1/L_I$, $P_2/L_I$, ..., $P_{K-1}/L_I$ with respect to layer $L_I$ as follows. Given primitive version $P_J/L_I$ corresponding to primitive $P_J$ and layer $L_I$, texture environment 180 receives the texture value $tI_\nu$ corresponding to layer $L_I$ for each fragment $F_\nu$ intersecting the primitive $P_J$ from texture filter 170, reads the fragment color vector $R(I-1)_\nu$ corresponding to fragment $F_\nu$ from TAB 181, and applies the texture value $tI_\nu$ to the fragment color vector $R(I-1)_\nu$ to generate a resultant fragment color vector $RI_\nu$. The resultant fragment color vector $RI_\nu$ is stored into TAB 181.

When the fragments $F_\nu$ corresponding to all the primitives of the current batch have been processed with respect to the penultimate layer $L_{M-2}$, i.e. the primitive versions $P_0/L_{M-2}$, $P_1/L_{M-2}$, $P_2/L_{M-2}$, ..., $P_{K-1}/L_{M-2}$ have been processed, texture environment 180 processes the primitive versions $P_0/L_{M-1}$, $P_1/L_{M-1}$, $P_2/L_{M-1}$, ..., $P_{K-1}/L_{M-1}$ with respect to the last layer $L_{M-1}$ as follows. Given primitive version $P_J/L_{M-1}$, sample generation and evaluation unit 174:

(1) populates each fragment $F_\nu$ intersecting the primitive $P_J$ with sample positions $S_{\nu k}$;

(2) determines which of the sample positions $S_{\nu k}$ reside interior to the primitive $P_J$, and sets a valid flag to indicate the interior or exterior status of each sample position $S_{\nu k}$;

(3) computes a z coordinate value for each interior sample position $S_{\nu k}$ based on a spatial interpolation of data associated with the primitive $P_J$ (e.g., in the case of triangle, an interpolation of the z values at the triangle vertices);

(4) forwards the fragment $F_\nu$ including the sample positions $S_{\nu k}$ and corresponding z values and valid flags to texture environment 180.

Texture environment 180 reads the fragment color vector $R(M-2)_\nu$ corresponding to fragment $F_\nu$ from TAB 181, receives texture value $t(M-1)_\nu$ from texture filter 170, and applies the texture value $t(M-1)_\nu$ to fragment color vector $R(M-2)_\nu$ to obtain a resultant fragment color vector $R(M-1)_\nu$. The resultant fragment color vector $R(M-1)_\nu$ may then be assigned to all the interior samples of fragment $F_\nu$, i.e. to all sample positions $S_{\nu k}$ which reside interior to fragment $F_\nu$. The fragment $F_\nu$ (now including the final sample color vectors of the interior samples) may be forwarded to fragment processor 184. Fragment processor 184 may store the fragment in a sample area of frame buffer 22. Frame buffer 22 uses the z values of the samples in the fragment $F_\nu$ to perform z buffering.

In the first set of embodiments described above, color is initially interpolated to sample resolution, and color is updated and stored in TAB 181 at sample resolution, although texture values are computed only at fragment resolution. In the second set of embodiments, color is initially interpolated to fragment resolution, and color is updated and stored in TAB at fragment resolution until the last texture layer is to be applied. At this last stage, samples are generated, the last texture layer is applied at fragment resolution, and the final per-fragment colors are assigned to all valid samples in their corresponding fragments.

Figure 8:
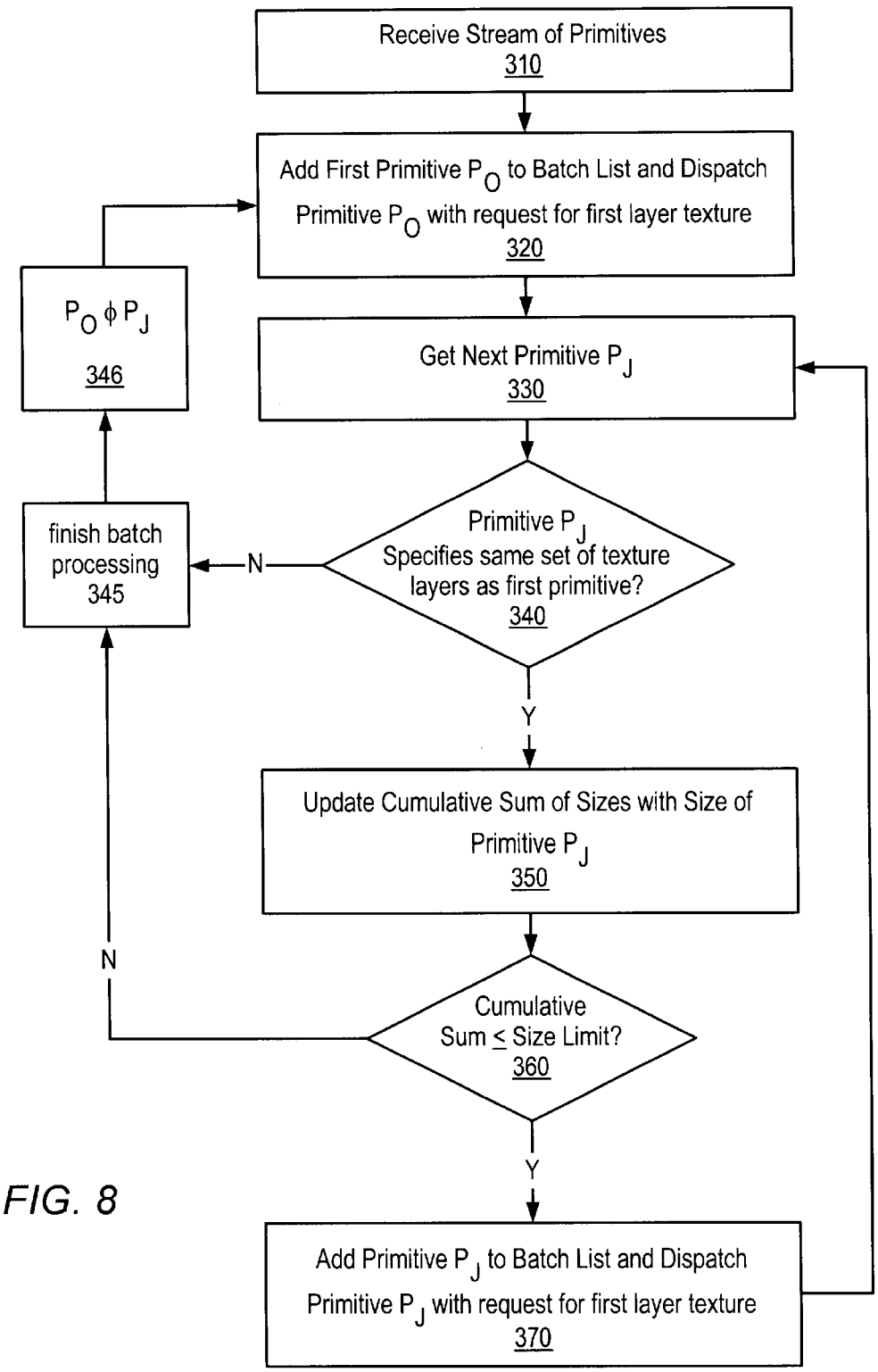
FIG. 8 illustrates one set of embodiments of a method for applying multiple textures to primitives to generate displayable images.

FIG. 8 illustrates one set of embodiments of a method for rendering displayable images. In step 310, a processor (e.g. vertex processor 162) receives a stream of primitives. Each primitive in the stream specifies one or more texture layers among those stored in texture memory 20 which are to be applied to the primitive.

In step 320, the processor adds a first primitive $P_0$ of the stream to a batch list, i.e. stores the first primitive in a batch buffer, and dispatches the first primitive $P_0$ to a rasterization unit with a texture layer request corresponding to the first texture layer specified by the first primitive $P_0$. For example, the rasterization unit may include render pipe 166 and the texture pipe of hardware accelerator 18. In response to receiving the first primitive $P_0$ with the first texture layer request, the rasterization unit applies textures from the first texture layer to fragments (or samples) associated with the first primitive $P_0$ and stores the fragments (or samples) in texture accumulation buffer 181.

In step 330, the processor accesses the next primitive $P_J$ of the stream. In step 340, the processor determines if the primitive $P_J$ specifies the same set of texture layers as the first primitive $P_0$. If primitive $P_J$ does specify the same set of texture layers as the first primitive $P_0$, the processor performs step 350. Otherwise, the processor performs step 345.

In step 350, the processor updates a cumulative sum S according to the relation S=S+SizeEst($P_J$), where SizeEst ($P_J$) is an estimate for the size (e.g. the fragment size) of the primitive $P_J$. The estimate may be an upper bound for the size. Note that a number U is said to be an upper bound for X when the X is less than or equal to U.

In step 360, the processor compares the cumulative sum S to a size limit. The size limit may equal the storage capacity (measured in fragments or samples) of texture accumulation buffer 181. If the cumulative sum S is less than or equal to the size limit, the processor performs step 370. If the cumulative sum S is greater than the size limit, the processor performs step 345.

In step 370, the processor adds the primitive $P_J$ to the batch list, i.e. stores the primitive into the batch buffer, and dispatches the primitive $P_J$ to the rasterization unit with a texture layer request corresponding to the first texture layer specified by the first primitive $P_0$. In response to receiving the primitive $P_J$ with the first texture layer request, the rasterization unit applies textures from the first texture layer to fragments (or samples) associated with the primitive $P_J$ and stores the fragments (or samples) in texture accumulation buffer 181. After step 370, the processor performs step 330.

As indicated above, the processor performs step 345 if the layer agreement test of step 340 fails or if the size limit test of step 360 fails. In step 345, the processor performs a "finish-up" procedure on the primitives of the batch. In the finish-up procedure, the processor cycles through the batch buffer repeatedly dispatching the primitives $P_0, P_1, P_2, \ldots, P_{K-1}$, of the batch list to the rasterization unit. In each cycle, the processor dispatches the primitives with texture layer requests corresponding to one of the texture layers $L_I$ specified by the first primitive. In the first cycle, the processor dispatches the primitives $P_0, P_1, P_2, \ldots, P_{K-1}$ with requests corresponding to the second texture layer specified by the first primitive. (The primitives are dispatched with first texture layer requests as they are being added to the batch list.) In the second cycle, the processor dispatches the primitives $P_0, P_1, P_2, \ldots, P_{K-1}$, with requests corresponding to the third texture layer specified by the first primitive. The last cycle corresponds to the last texture layer specified by the first primitive.

In response to receiving primitive $P_J$ with a texture layer request corresponding to texture layer $L_I$, the rasterization unit applies textures from the texture layer $L_I$ to fragments (or samples) associated with the primitive $P_J$ and stores the fragments (or samples) in texture accumulation buffer 181.

After step 345 is completed, the processor performs step 346. In step 346, the buffer list is reinitialized, the cumulative sum S is set to zero, and the primitive $P_J$ becomes the first primitive of the new buffer list. After step 345, the processor performs step 320 again.

Size Estimation for Graphics Primitives

As described above, graphics system 112 may be configured to apply multiple texture layers to a batch of graphics primitives (such as triangles, dots, lines or polygons). Render pipe 166 identifies fragments that intersect batch primitives, and the texture pipe (including texture environment 180) applies the multiple layers of texture to the intersecting fragments or samples within the intersecting fragments. Texture environment 180 stores fragment or sample color information for the intersecting fragments in TAB 181 between the application of successive texture layers.

The storage capacity (i.e. size) of TAB 181 implies a limit on the size of a batch of primitives processed by the texture pipe. To prevent overflow of TAB 181, a cumulative sum of fragment sizes (or estimates of fragment sizes) of primitives in a batch may be limited to be less than or equal to the fragment capacity of TAB 181. The fragment size of a primitive is the number of fragments that geometrically intersect the primitive.

In some embodiments, TAB 181 may store multiple samples per fragment. In these embodiments, TAB 181 has a fragment capacity and a sample capacity. The sample capacity is equal to the fragment capacity times the number of samples allocated per fragment. In other embodiments, TAB 181 stores color information for fragments and not for samples. For example, TAB 181 may store a single RGB color vector per fragment.

In one embodiment, the storage capacity of TAB 181 is equal to 1024 entries. An entry may store color information for a fragment. Alternatively, an entry may store color information for a sample within a fragment. TAB 181 may have any desired storage capacity subject to the fundamental limitations of cost, die area, complexity, etc. Powers of two are favored for the TAB capacity.

Vertex processor 162 may generate a conservative size estimate for each received primitive, i.e. may report a value for each primitive which is greater than or equal to the actual number of fragments intersecting the primitive. Vertex processor 162 may implement any of a variety of size estimates. Typically the computational effort for a size estimate depends on the accuracy attained by the estimate. In other words, it is computationally more expensive to obtain a size estimate which stays close to the actual size of the primitive than an estimate which reports a generous upper bound for the actual size. Accurate estimates typically require more complex arithmetic hardware—more multipliers, adders and subtractors. Thus, the size estimate employed by vertex processor 162 may depend on the time budget (e.g. the number of clock cycles) allowed for the size estimate computation and/or the amount of die area allocated for the size estimation circuitry. The actual size of a primitive may be defined as the number of fragments which geometrically intersect with the primitive. For example, in FIG. 7, eleven fragments geometrically intersect with the given triangle. Thus, the actual size of the triangle is 11.

Much of the following discussion focuses on size estimation for triangles. However, the size estimation methodologies disclosed herein naturally generalize to other primitives such as polygons, lines and dots.

In one set of embodiments, vertex processor 162 may generate the size estimate for a current triangle as follows. Vertex processor 162 may compute the coordinates for an axis-aligned bounding box that minimally contains the current triangle. The term "axis-aligned" means that the bounding box has sides parallel to the coordinate axes of sample space. The coordinates of the minimal bounding box may be computed by determining the minimum and maximum of the horizontal and vertical coordinates of the triangle vertices:

$X_{min}=\min\{X_1,X_2,X_3\}$ $X_{max}=\max\{X_1,X_2,X_3\}$ $Y_{min}=\min\{Y_1,Y_2,Y_3\}$ $Y_{max}=\max\{Y_1,Y_2,Y_3\}$, where $(X_i,Y_i)$ defines the $i^{th}$ triangle vertex.

Furthermore, vertex processor 162 may compute a width W and height H for the minimal bounding box according to the relations:

$$W = X_{max} - X_{min}$$

$$H = Y_{max} - Y_{min}.$$

The area of the triangle is (½)WH. Under the assumption that each fragment is a one-by-one square in sample space with edges having integer coordinates, a generic triangle may intersect a number of fragments which is significantly larger than its area (½)WH. For example, a right triangle with vertices at (0,0), (0,10) and (10,10) intersects 55 fragments instead of 50=(½)(10)(10) fragments. In one set of embodiments, this discrepancy is accounted for by computing an estimate E for the area (½)WH, adding a positive integer constant $C_{margin}$ to the estimate E, and comparing the sum E+$C_{margin}$ to the TAB fragment capacity. In one embodiment, the estimate E may be the area itself.

In one set of embodiments, the value of $C_{margin}$ may be the (Euclidean or Manhattan distance) perimeter of the triangle. The perimeter accounts for the partial fragments which are touched by the triangle along its edges.

More generally, the value of $C_{margin}$ may be chosen to be any upper bound for the discrepancy between the actual number of intersecting fragments and the triangle area for all possible triangles with actual number less than or equal to the TAB fragment capacity. The value $C_{margin}$ may be supplied by a user, system operator, system designer, etc.

In another set of embodiments, the values of W and H are increased by additive constants so that the new triangle area (½)(W+ΔW)(H+ΔH) is guaranteed to be greater than or equal to the number of intersecting fragments. Thus, vertex processor 162 may perform width and height adjustment according to the relations:

$$W = W + \Delta W$$

$$H = H + \Delta H,$$

where ΔW and ΔH are positive constants, and generate an estimate E for the new triangle area (½)WH, and compare the estimate E directly to the TAB fragment capacity.

In some embodiments, vertex processor 162 may implement the size comparison based on the following analysis. Let W and H be represented as binary words. Let α be the bit position of the leading one in the binary representation of W. The leading one is the one bit that occurs closest to the most significant bit position in the representation of W. Bit positions are counted starting from zero at the least significant bit and increase with each successively more significant bit. The following table gives several examples.

| W | α |
|---|---|
| 00110101 | 5 |
| 00000110 | 2 |
| 10001011 | 7 |
| 00000001 | 0 |

The table gives examples for eight-bit words. However, a wide variety of word lengths are contemplated for W and H.

It is a basic mathematical fact that W is less than or equal to $2^{\alpha+1}$. A similar statement may be made for height H. Let β be the bit position of the leading one in the binary representation of H. So H is less than or equal to $2^{\beta+1}$.

It follows that the triangle area (½)WH is less than (½)($2^{\alpha+1}$)$2^{\beta+1}$)=$2^{\alpha+\beta+1}$:

$$(½)WH < 2^{\alpha+\beta+1}.$$

In other words, $2^{\alpha+\beta+1}$ is an upper bound for the area (½)WH. If the upper bound $2^{\alpha+\beta+1}$ is less than or equal to the TAB fragment capacity $N_{TAB}$, the triangle area is automatically smaller than the TAB fragment capacity $N_{TAB}$:

$$(½)WH < 2^{\alpha+\beta+1} \leq N_{TAB}.$$

Let γ be the bit position of the leading one in the binary representation of $N_{TAB}$. Then $2^{\gamma} \leq N_{TAB}$. Because (½)WH<$2^{\alpha+\beta+1}$ and $2^{\gamma} \leq N_{TAB}$, the triangle area is guaranteed to be smaller than the TAB fragment capacity if:

$$2^{\alpha+\beta+1} \leq 2^{\gamma}.$$

However, the last inequality holds if and only if α+β+1≤γ, or equivalently, α+β<γ.

Thus, in one set of embodiments, vertex processor 162 may determine leading one positions α and β for width W and height H respectively, and perform the comparison α+β<γ. Observe that this comparison does not require any multipliers, and thus, may be performed quickly.

In one embodiment, $N_{TAB}$ is equal to a power of 2. In this case, $N_{TAB}$ exactly equals $2^{\gamma}$.

In some embodiments, vertex processor 162 may generate upper bounds for W and H which utilize more information than merely the leading one positions α and β respectively. In other words, by creating mantissas of W and H and multiplying the mantissas, vertex processor 162 may more closely match the targeted inequality (½)WH<$2^{\gamma}$. This comes at the expense of the multipliers and barrel shifters needed to implement the refined computation. Let L represent the number of bits in the mantissa for W, and M the number of bits in the mantissa for H. As the numbers L and M increase the implementation cost increases but the estimation accuracy increases. Thus, the mantissa lengths L and M may be chosen to achieve an optimal tradeoff between cost and estimation accuracy. Various embodiments are contemplated with various values for mantissa lengths L and M.

Batching of Chained Primitives

Figure 9:
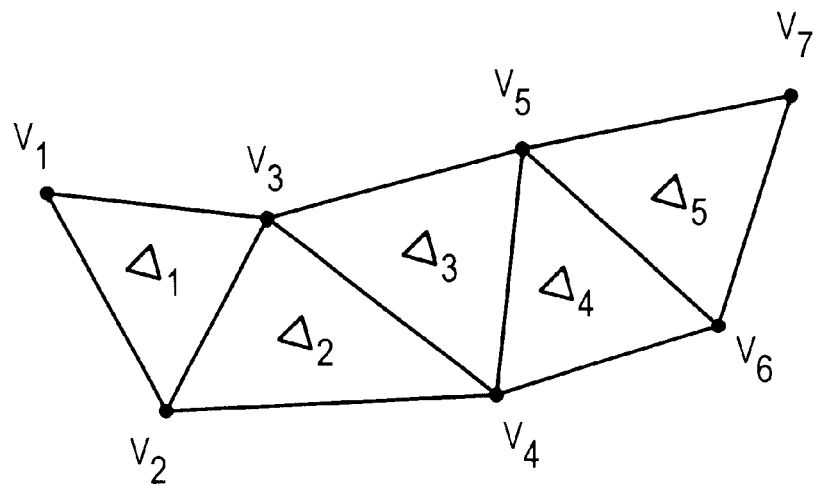
FIG. 9 illustrates one example of a chained sequence of primitives, i.e. a triangle strip.

It is very common to define "chained" graphics primitives, such as the OpenGL TriStrip, TriFan, etc. These primitives may share vertices. For example, a TriStrip might define five triangles from seven vertices as shown in FIG. 9. The seven vertices $V_1$–$V_7$ define five triangles $\Delta_1$ through $\Delta_5$ in a contiguous strip. In general it takes N+2 vertices to define N triangles using a TriStrip or TriFan. The texture layers (and other properties, such as material propeties and color) may be common for all elements of a "chained" primitive such as a TriStrip.

Although it is possible to simply estimate the area of the strip by computing the sum of the estimated areas of the triangles:

$$A_{strip} = A_1 + A_2 + A_3 + A_4 + A_5,$$

this methodology may result in an inflated area estimate, i.e. an area estimate which is significantly larger than the actual area of the strip. The extra margin along "internal" edges is double counted (i.e. the margin along the edge v2v3 that is outside triangle $\Delta_1$ is inside $\Delta_2$, and vice versa; this over-counting also holds true for edges v3v4, v4v5, v5v6). These pieces of double-counted area can add up over a longer strip to significantly inflate the estimated area for the strip.

Texture processing efficiency is negatively impacted because batches don't fill up the TAB.

In one set of embodiments, a processor (such as vertex processor 162) may directly compute a running estimate of the strip's area instead of a running total of the individual triangle estimates. This approach avoids double counting the fragments along the "internal" edges.

In one embodiment, the running estimate of the strip's area may be computed as follows. A processor may determine a bounding box for the entire strip from vertex V1 through Vn as each new vertex vertex Vk is added, where n is a positive integer. Let Xk and Yk be the coordinates of vertex Vk. The coordinates Xmin, Xmax, Ymin and Ymax for the bounding box are defined by the relations:

$Xmin=\text{floor}(min\{X1, X2, \ldots, Xn\})$ $Xmax=\text{cieling}(max\{X1, X2, \ldots, Xn\})$ $Ymin=\text{floor}(min\{Y1, Y2, \ldots, Yn\})$ $Ymax=\text{ceiling}(max\{Y1, Y2, \ldots, Yn\}).$ Recall that floor(x) is the greatest integer which is less than or equal to x, and ceiling(x) is the smallest integer which is greater than or equal to x. These bounding box coordinates may be computed incrementally, i.e. as each vertex arrives. For example, the values Xmin and Xmax may be initialized based on the vertices V1, V2 and V3 of the first triangle in the strip by computing:

$Xmin=\text{floor}(min\{x1, x2, x3\})$ $Xmax=\text{ceiling}(max\{x1, x2, x3\}).$ Then, in response to receiving each vertex $V_K$, where K runs from four to n, the values Xmin and Xmax may be updated according to the relations:

$Xmin=\text{floor}(min\{Xk,Xmin\})$ $Xmax=\text{ceiling}(max\{Xk,Xmax\}).$

The values Ymin and Ymax may be similarly initialized and updated. As a new vertex is added, the new bounding box sides may be the same as the old sides, or, one or more sides may be pushed outwards by the new vertex. While the bounding box may overestimate the strip area by as much as a factor of two, this bounding box estimate is still better than using the sum of the individual triangle bounding boxes, each of which can be 2× overestimated, because the double-counting at the internal edges result in a greater total overestimate.

In another set of embodiments, the running estimate of the strip's area may be computed based on the equation for the area of a polygon. The area of a N-sided polygon with vertices $V_1, V_2, V_3, \ldots, V_N$ is given by the expression:

$$PolyArea = \frac{1}{2}\sum_{k=1}^{n}(x_k y_{k+1} - x_{k+1} y_k),$$

where vertex $V_k=(x_k,y_k)$, and where $x_{N+1}=x_1$ and $y_{N+1}=y_1$. For example, for a six-sided polygon, the polygon area with vertices V1, V2, V3, V4, V5 and V6 is given by the expression:

½*((X1*Y2−X2*Y1)

+(X2*Y3−X3*Y2)

+(X3*Y4−X4*Y3)

+(X4*Y5−X5*Y4)

+(X5*Y6−X6*Y5)

+(X6*Y1−X1*Y6)).

Observe that the area A(k) of a polygon generated by vertices V1 through Vk may be expressed as one-half the sum of a homogeneous term H(k) and a balance term B(k), i.e.:

$A(k)=\frac{1}{2}(H(k)+B(k)),$ where $$H(k) = \sum_{j=1}^{k-1}(x_j y_{j+1} - x_{j+1} y_j) \text{ and}$$

$B(k)=x_k y_1 - x_1 y_k.$

The homogeneous term H(k) may be computed incrementally (i.e. as each new vertex arrives). In response to receiving the new vertex $V_{k+1}=(x_k,y_k)$, the homogeneous term may be updated according to the recursive relation:

$H(k+1)=H(k)+x_k y_{k+1} - x_{k+1} y_k.$

The balance term B(k+1) for the new vertex is given by:

$B(k+1)=x_{k+1} y_1 - x_1 y_{k+1}.$

Thus, the updated polygon area $A(k+1)=\frac{1}{2}(H(k+1)+B(k+1))$ may be computed with four multiplies and four additions.

A processor (e.g. vertex processor 162) may initialize the homogenous term after receiving the first two vertices of a chain (e.g. a strip), i.e. vertices V1 and V2, by computing H(2)=(X1*Y2−X2*Y1). Then, for each succeeding vertex, the processor may update the homogeneous term as indicated above, compute the balance term, and compute the updated polygon area using the updated homogeneous term and balance term.

Figure 10:
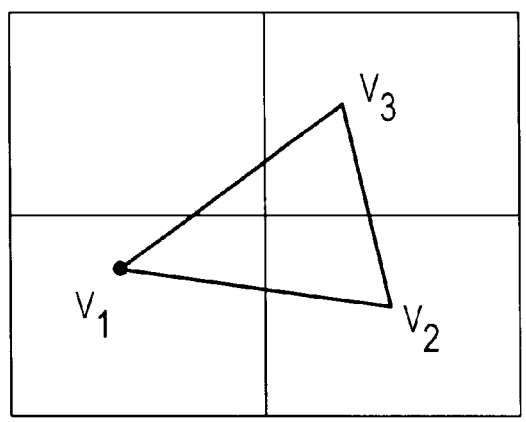
FIG. 10 illustrates an example of a primitive whose is significantly smaller than the number of fragments intersected by the primitive.

Note that a primitive (or chain of primitives) may intersect a number of fragments which is larger than the area of the primitive (or chain of primitives) as illustrated by FIG. 10. The triangle V1V2V3 intersects four fragments but has an area which is significantly smaller than four. In some embodiments, a fragment size estimate S for a chain of primitives may be obtained by adding the perimeter of the chain to the polygon area of the chain: S=Perimeter+PolyArea. Adding the perimeter accounts for fragments which are partially covered on the outside edges of the chain. Again, this perimeter computation may be performed incrementally (i.e. as each new vertex arrives). Let P(k) denote the perimeter of the chain defined by vertices V1, V2, V2, . . . , Vk. The perimeter P(k) may be represented as the sum of an first term G(k) and a second term R(k), i.e. P(k)=G(k)+R(k), where:

$$G(k) = \sum_{j=1}^{k-1} \text{Length}(V_j V_{j+1})$$

$R(k)=\text{Length}(V_k V_1).$

The first term measures the length of the path V1, V2, V3, . . . , Vk. The second term measures the length of the return leg (i.e. the line segment) from vertex Vk to vertex V1 that completes the closed circuit around the polygonal chain. The term G(k) is referred to herein as the partial perimeter, and the term R(k) is referred to herein as the perimeter complement. The expression Length(AB) represents the length of the line segment spanning point A and point B.

In response to receiving a new vertex $V_{k+1}$, the processor may update the first term according to the recursive relation:

$$G(k+1)=G(k)+\text{Length}(V_k V_{k+1}).$$

In addition, the processor may compute the second term according to the relation:

$$R(k+1)=\text{Length}(V_{k+1}V_1),$$

and then update the chain perimeter according to the relation P(k+1)=G(k+1)+R(k+1).

In the method of FIG. 8, a processor (such as vertex processor 162) is configured to gather primitives into a batch until a sum of size estimates for the primitives exceeds the TAB fragment capacity. The first primitive which pushes the sum over the TAB fragment capacity gets saved for the next batch, and the current batch is processed (i.e. rendered and textured). However, as described above, the processor may compute an estimate for the fragment size of a chain of primtives (e.g. a strip or a fan) by methods which are more accurate than a sum of size estimates for each the primtives. These more accurate estimates may be computed incrementally as each vertex in a chain is received. Various embodiments are contemplated where step 350 and 360 are modified to operate with these more accurate estimates.

Thus, step 350 may be more generally described as updating a current size estimate (e.g. fragment size estimate) for the batch based on the new vertex corresponding to the new primitive $P_J$. And step 360 may be more generally described as comparing the updated fragment size estimate for the batch to the size limit (e.g. the TAB fragment capacity).

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:

a texture memory configured to store a plurality of texture layers;

a texture pipe;

a texture accumulation buffer; and a vertex processor configured to (a) receive a first stream of primitives, wherein each primitive of said first stream specifies a subset of the texture layers in said texture memory, (b) store primitives of said first stream, starting with a first primitive of said first stream, on a current batch list in a batch buffer until a size estimate of the batch exceeds a size limit or until a second primitive of said first stream is identified which does not specify the same set of texture layers as the first primitive, wherein the vertex processor is configured to dispatch the primitives of the current batch list to the texture pipe;

wherein the texture pipe is configured to (c) access the texture memory for data values from an $I^{th}$ layer of the texture layers specified by said first primitive from the texture memory, (d) apply the data values to color vectors corresponding to the primitives of the current batch list, (e) store the color vectors after said application of the data values into the texture accumulation buffer, and (f) to repeatedly perform (c), (d) and (e) so that the $I^{th}$ layer successively runs through each of the texture layers specified by the first primitive;

wherein said samples, after a final iteration of (c), (d) and (e) with respect to the current batch list, are usable to generate a video output signal.

2. The graphics system of claim 1 further comprising a render pipe and a sample processing unit, wherein, for each primitive of the current batch list, the render pipe is configured to identify fragments in a render space which intersect the batch list primitive, and the sample processing unit is configured to compute the color vectors at sample positions interior to the intersecting fragments and interior to the batch list primitive.

3. The graphics system of claim 2, wherein the sample processing unit is configured to provide the color vectors of the intersecting fragments of the batch list primitives to the texture pipe for a first iteration of (d) with respect to a first layer of said texture layers specified by the first primitive.

4. The graphics system of claim 1, wherein, in second and succeeding iterations of (c), (d) and (e), the texture pipe is configured to read the color vectors from the texture accumulation buffer, and apply the data values to said color vectors read from the texture accumulation buffer.

5. The graphics system of claim 1, wherein the vertex processor is configured to store the second primitive in a temporary buffer, to set the size estimate for the batch to zero and flush the batch buffer in response to receiving the second primitive, and to start a new batch list by storing the second primitive in the batch buffer after the final iteration of (c), (d) and (e) with respect to the current batch list.

6. The graphics system of claim 1, wherein the size limit is a storage capacity of the texture accumulation buffer.

7. The graphics system of claim 1, wherein the vertex processor is configured to dispatch primitives of the current batch list to the texture pipe once per texture layer specified by the first primitive in an order which has successive primitives as the inner loop and successive texture layers as the outer loop.

8. The graphics system of claim 1, wherein the vertex processor is configured to estimate a primitive size for each primitive of the first stream and add the primitive size to the batch size estimate, and compare the batch size estimate to the size limit.

9. The graphics system of claim 1, wherein the vertex processor is configured to update a value H according to the recursive relation:

$$H=H+x_k y_{k+1}-x_{k+1} y_k$$

in response to receiving a new vertex $V_{k+1}$ associated with a new primtive of the first stream, wherein $x_{k+1}$ and $y_{k+1}$ are coordinates of the new vertex $V_{k+1}$, wherein $x_k$ and $y_k$ are coordinates of a previous vertex associated with a previous primitive of the first stream, wherein the vertex processor is configured to compute the batch size estimate using data comprising the value H.

10. The graphics system of claim 1, wherein the vertex processor is configured to update a partial perimeter G according to the recursive relation:

$$G=G+\text{Length}(V_k V_{k+1})$$

in response to receiving a new vertex $V_{k+1}$ associated with a new primitive of the first stream, wherein $\text{Length}(V_k V^{k+1})$ denotes a length of the line segment from a previous vertex $V_k$ associated with a previous primitive of the first stream to the new vertex $V_{k+1}$, wherein the vertex processor is configured to compute the batch size estimate using data comprising the partial perimeter G.

11. The graphics system of claim 1, wherein the color vectors are fragment color vectors corresponding to fragments in a sample space which intersect the primitives of the batch list, wherein the texture pipe is configured to generate sample color vectors for samples interior to the intersecting fragments and interior to the primitives of the batch list after the final iteration of (c), (d) and (e) with respect to the current batch list.

12. A graphics system comprising:
a texture memory configured to store a plurality of texture layers;
a texture pipe;
a texture accumulation buffer; and
a vertex processor configured to receive a first stream of primitives and to store consecutive primitives of said first stream on a batch list in a batch buffer as long as (a) each of the consecutive primitives specify a common subset of the texture layers in said texture memory and (b) a size estimate associated with the batch list is less than or equal to a size limit;
wherein, for each texture layer of the common subset of texture layers, the texture pipe is configured to access the texture memory for texels from said texture layer, apply said texels to color data associated with the primitives of the batch list, and store the color data after said application of said texels into the texture accumulation buffer, wherein the color data associated with the primitives is usable to generate at least a portion of a video output signal.

13. The graphics system of claim 12, wherein the color data associated with said primitives of the batch list are color vectors for samples populating said primitives of the batch list, wherein the graphics system further comprises a frame buffer and a sample filter;
wherein the texture pipe is configured to store the color vectors of the samples in a sample area of the frame buffer after an application of a last of said common subset of texture layers to the primitives;
wherein the sample filter is configured to read and filter the color vectors of the samples from the sample area of the frame buffer to determine pixel values and store the pixel values in a pixel area of the frame buffer.

14. The graphics system of claim 13 further comprising a video output processor configured to read the pixel values from the pixel area of the frame buffer and generate said at least a portion of a video output signal from the pixels, and to provide the video output signal to a video output port.

15. The graphics system of claim 12, wherein the size limit is a storage capacity of the texture accumulation buffer.

16. The graphics system of claim 12, wherein the vertex processor is configured to update a homogeneous term H according to the recursive relation:

$$H=H+x_k y_{k+1}-x_{k+1} y_k$$

in response to receiving a new vertex $V_{k+1}$ associated with a new primtive of the first stream, wherein $x_{k+1}$ and $y_{k+1}$ are coordinates of the new vertex $V_{k+1}$, wherein $x_k$ and $y_k$ are coordinates of a previous vertex $V_k$ corresponding to a previous primitive $P_k$ of the first stream, wherein the vertex processor is configured to compute the size estimate using data comprising the homogeneous term H.

17. The graphics system of claim 12, wherein the vertex processor is configured to update a partial perimeter G according to the recursive relation:

$$G=G+\text{Length}(V_k V_{k-l})$$

in response to receiving a new vertex $V_{k+1}$ associated with a new primitive of the first stream, wherein $\text{Length}(V_k V_{k+1})$ denotes a length of the line segment from a previous vertex $V_k$ associated with a previous primitive of the first stream to the new vertex $V_{k+1}$, wherein the vertex processor is configured to compute the size estimate using data comprising the partial perimeter G.

18. A method comprising:
receiving a first stream of primitives;
storing consecutive primitives of said first stream in a batch buffer (a) provided each of the consecutive primitives specify a common subset of a set of texture layers stored in a texture memory and (b) until a size estimate associated with primitives in the batch buffer exceeds a size limit;
accessing and applying each texture layer of said common subset from said texture memory to color data associated with the primitives of the batch buffer; and
storing the color data associated with the primitives of the batch buffer in a texture accumulation buffer between the application of successive texture layers of said common subset, wherein the size limit is a storage capacity of the texture accumulation buffer.

19. A method comprising:
receiving a stream of primitives;
collecting a batch of said primitives which specify a common set of texture layers to be applied as long as a size estimate for said batch is less than or equal to a capacity of said texture accumulation buffer;
generating color data vectors for the batch of primitives;
applying texture values from a first of said texture layers to the color data vectors and storing the color data vectors in a texture accumulation buffer;
(a) reading the color data vectors from the texture accumulation buffer;
(b) applying texture values from an Ith of said texture layers to the color data vectors;
(c) storing the color data vectors in the texture accumulation buffer;
repeatedly performing (a), (b) and (c) for each of said common set of texture layers after said first texture layer, wherein said color data vectors after a final repetition of (a), (b) and (c) are usable to determine pixels of a displayable image.

20. The method of claim 19 wherein (a), (b) and (c) are performed in a pipelined fashion.

21. The method of claim 19 wherein said generating color data vectors for the batch of primitives comprises:
generating sample positions in a two-dimensional screen space;
computing a color data vector at each of said sample positions.

22. The method of claim 19 further comprising:
estimating a size for each primitive of said stream;
adding the primitive size to the batch size estimate; and
comparing the batch size estimate to the texture accumulation buffer capacity to determine if the primitive is to be added to the batch.

23. The method of claim 19 further comprising: updating a homogeneous term H according to the recursive relation:

$$H=H+x_k y_{k+1}-x_{k+1} y_k$$

in response to receiving a new vertex $V_{k+1}$ associated with a new primtive of said stream, wherein $x_{k+1}$ and $y_{k+1}$ are coordinates of the new vertex $V_{k+1}$, wherein $x_k$ and $y_k$ are coordinates of a previous vertex associated with a previous primitive of the primitive stream; and computing the batch size estimate using data comprising the homogeneous term H.

24. The method of claim 19 further comprising:

updating a partial perimeter G according to the recursive relation:

$$G = G + \text{Length}(V_k V_{k+1})$$

in response to receiving a new vertex $V_{k+1}$ associated with a new primitive of said stream, wherein $\text{Length}(V_k V_{k+1})$ denotes a length of the line segment from a previous vertex $V_k$ associated with a previous primitive of the stream to the new vertex $V_{k+1}$;

computing the batch size estimate using data comprising the partial perimeter G.

25. The method of claim 19 further comprising filtering said color data vectors to generate said pixel values of said displayable image.

* * * * *

UNITED STATES PATENT AND TRADEMARK OFFICE
CERTIFICATE OF CORRECTION

PATENT NO. : 6,795,080 B2
DATED : September 21, 2004
INVENTOR(S) : Lavelle et al.

It is certified that error appears in the above-identified patent and that said Letters Patent is hereby corrected as shown below:

Column 24,
Line 64, please delete "$G = G = Length(V_k V_{k+1})$" and substitute
-- $G = G + Length(V_k V_{k+1})$ --.

Column 26,
Line 38, please delete "Ith" and substitute -- $I^{th}$ --.
Line 67, please delete "primtive" and substitute -- primitive --.

Signed and Sealed this

Twenty-eighth Day of December, 2004

JON W. DUDAS
*Director of the United States Patent and Trademark Office*